United States Patent
Kim et al.

(10) Patent No.: US 7,218,654 B2
(45) Date of Patent: May 15, 2007

(54) EYE DIAGRAM IMPROVING METHOD FOR LASER TRANSMITTER

(75) Inventors: Young Gon Kim, San Jose, CA (US);
Jae Joon Chang, San Jose, CA (US);
Myunghee Lee, San Jose, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/205,633

(22) Filed: Aug. 16, 2005

(65) Prior Publication Data

US 2005/0276289 A1  Dec. 15, 2005

Related U.S. Application Data

(62) Division of application No. 10/660,405, filed on Sep. 10, 2003.

(51) Int. Cl.
*H01S 3/13* (2006.01)
(52) U.S. Cl. .............................. 372/29.01; 372/38.02; 372/38.07
(58) Field of Classification Search .............. 372/29.01, 372/38.02, 38.07
See application file for complete search history.

(56) References Cited

U.S. PATENT DOCUMENTS 6,532,245 B1   3/2003  Paschal et al.
6,570,394 B1 *  5/2003  Williams ................. 324/620
2004/0031272 A1 *  2/2004  Mecherle et al. ............. 62/3.7

FOREIGN PATENT DOCUMENTS

WO   WO 03/069378 A2   8/2003

OTHER PUBLICATIONS

German Office Action, Nov. 2, 2005, Application No. 10 2004 023 825.1-35 (8 pages).
English Translation of German Office Action, dated Nov. 2, 2005, Application No. 10 2004 023 825.1-35, (6 pages).
D.S. McPherson et al., "A 3-V Fully Differential Distributed Limiting Driver for 40 Gb/s Optical Transmission Systems," 2002 IEEE GaAs Digest, pp. 95-98.

* cited by examiner

*Primary Examiner*—Dung T. Nguyen

(57) ABSTRACT

A method for calibrating a laser transmitter includes (a) detecting an eye diagram of an output from the laser transmitter, (b) determining if the eye diagram is acceptable, (c) if the eye diagram is not acceptable, changing a value of a control signal in the laser transmitter, wherein the control signal sets an amplitude characteristic of a limiting amplifier coupled to a laser driver in the laser transmitter, and (d) repeating steps (a), (b), and (c) until the eye diagram is acceptable.

6 Claims, 4 Drawing Sheets

EYE DIAGRAM IMPROVING METHOD FOR LASER TRANSMITTER

This is a Divisional of copending application Ser. No. 10/660,405, filed on Sep. 10, 2003, the entire disclosure of which is incorporated herein by reference.

FIELD OF INVENTION

This invention relates to fiber optic laser transmitters.

DESCRIPTION OF RELATED ART

As the speed of fiber optic transmitter exceeds 1 Gbps (gigabits per second), the existing VCSEL (vertical cavity surface emitting laser) based fiber optic transmitters suffer from degraded eye quality of the laser output signal from the interaction between the laser driver circuit and the laser diode. Since the laser output quality mainly depends on the impedance-matching between the laser driver circuit and the laser diode, the conventional way to improve the output eye quality is to use a matching network between the laser driver circuit and the laser. Such a matching network compensates the impedance mismatch and therefore improves the output eye quality.

However, matching network is undesirable in fiber optic transmitters in parallel or multi-channel application due to the size of on-chip or off-chip matching network circuitry. Furthermore, the matching network cannot compensate the effect of random variation from channel to channel and from part to part.

Thus, what is needed is a method and an apparatus that address the problems identified above.

SUMMARY

In one embodiment of the invention, a method for calibrating a laser transmitter includes (a) detecting an eye diagram of an output from the laser transmitter, (b) determining if the eye diagram is acceptable, (c) if the eye diagram is not acceptable, changing a value of a control signal in the laser transmitter, wherein the control signal sets an amplitude characteristic of a limiting amplifier coupled to a laser driver in the laser transmitter, and (d) repeating steps (a), (b), and (c) until the eye diagram is acceptable.

DETAILED DESCRIPTION

Figure 1:
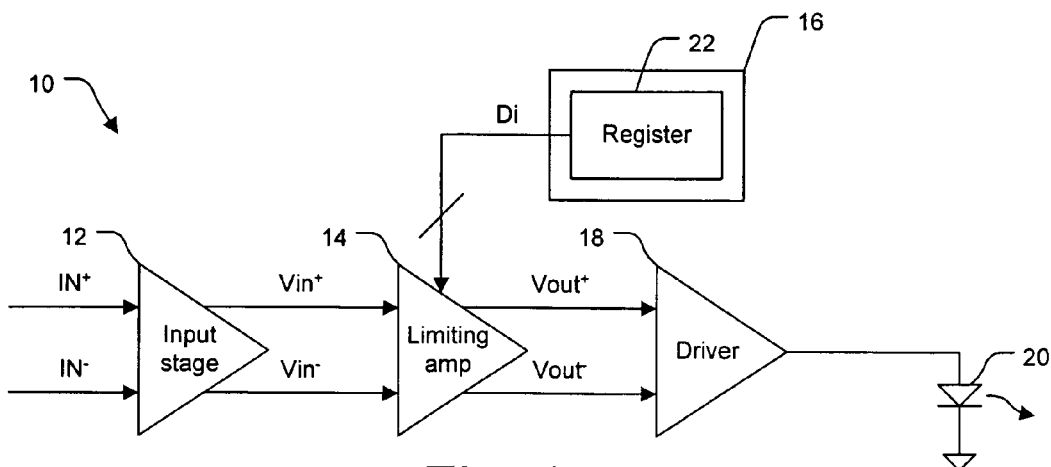
FIG. 1 is a block diagram of a laser transmitter in one embodiment of the invention.

FIG. 1 illustrates a laser transmitter 10 in one embodiment of the invention. Laser transmitter 10 includes a conventional input stage 12, a limiting amplifier 14, an amplitude/common-mode control circuit 16, a conventional laser driver 18, and a conventional laser diode 20. Although illustrated as a single channel laser transmitter, one skilled in the art understands that a multi-channel laser transmitter can be constructed by repeating such a structure.

Input stage 12 has its non-inverted and inverted input terminals coupled to receive input voltage signals IN$^+$ and IN$^-$, respectively. Input stage 12 provides output voltage signals Vin$^+$ and Vin$^-$ with steady voltage swings in response to input voltage signals IN$^+$ and IN$^+$ that may have variable voltage-swings.

Limiting amplifier 14 has its non-inverted and inverted input terminals coupled to the non-inverted and inverted output terminals of input stage 12, respectively. Furthermore, limiting amplifier 14 has one or more control terminals coupled to one or more output terminals of amplitude/common-mode control circuit 16. Limiting amplifier 14 provides a gain over input stage 12. Thus, limiting amplifier 14 generates output voltage signals Vout$^+$ and Vout$^-$ with improved rise and fall times over input voltage signals Vin$^+$ and Vin$^-$. Limiting amplifier 14 also holds output voltage signals Vout$^+$ and Vout$^-$ to levels prescribed by one or more digital control signals Di received from control circuit 16. Furthermore, limiting amplifier 14 may provide a level shift to change the common-mode voltage of output voltage signals Vout$^+$ and Vout$^-$ prescribed by digital control signals Di. In one embodiment, control circuit 16 includes a register 22 that stores and outputs control signals Di.

Figure 2:
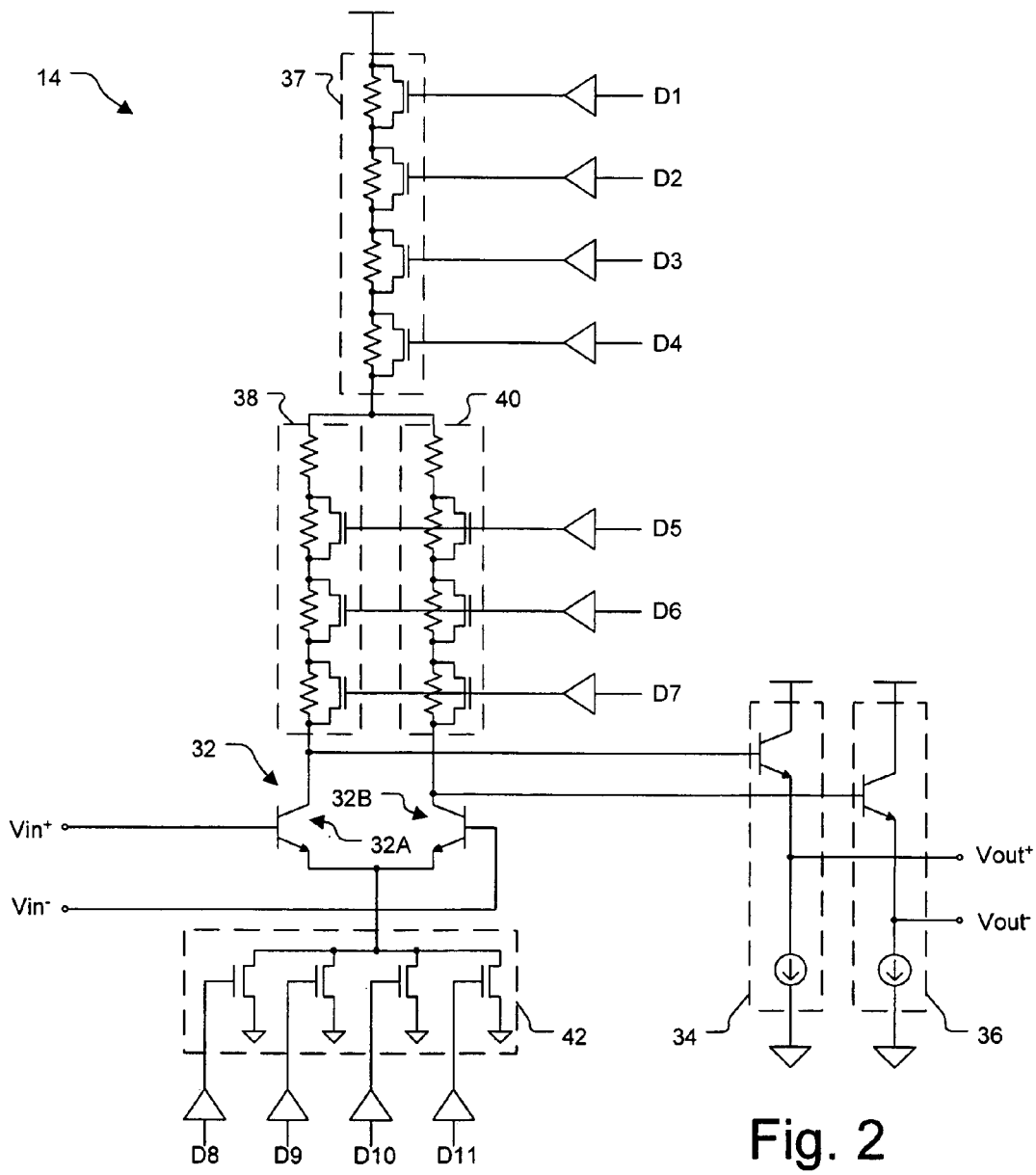
FIG. 2 is a circuit diagram of a limiting amplifier in the laser transmitter of FIG. 1 in one embodiment of the invention.

FIG. 2 is a circuit diagram of limiting amplifier 14 in one embodiment of the invention. Limiting amplifier 14 includes a differential pair 32 digitally calibrated by variable resistors 37, 38, and 40, and a programmable current source 42. Differential pair 32 consists of bipolar transistor 32A and 32B having their bases coupled to receive differential inputs and their emitters tied at a common node.

In one embodiment, variable resistors 37, 38, and 40 are voltage controlled resistors (VCRs). VCR 37 has an input terminal coupled to rail and an output terminal coupled in parallel with VCRs 38 and 40. VCRs 38 and 40 have output terminals coupled to the corresponding collectors of bipolar transistors 32A and 32B. Current sources 34 and 36 have input terminals coupled to the corresponding collectors of bipolar transistors 32A and 32B, and output terminals that provide the corresponding output voltage signals Vout+ and Vout−. Programmable current source 42 has an input terminal coupled in parallel to the emitters of bipolar transistors 32A and 32B and an output terminal coupled to ground. The resistances of VCRs 37, 38, and 40 are adjusted to vary the amplitude characteristics of limiting amplifier 14, such as peak-to-peak amplitude, peak amplitude, and common-mode. Additionally, the current sank by programmable current source 42 can be adjusted to vary the output amplitude characteristics of limiting amplifier 14.

In one embodiment, VCR 37 includes four resistors coupled in series, and four bypass transistors coupled in parallel with their corresponding resistors so the resistors can be bypassed by turning on their corresponding bypass transistors. The bypass transistors are controlled by digital control signals D1, D2, D3, and D4 to set the resistance of VCR 37.

In one embodiment, VCRs 38 and 40 each includes four resistors coupled in series, and three bypass transistors coupled in parallel with their corresponding resistors so the resistors can be bypassed by turning on their corresponding bypass transistors. The bypass transistors are controlled by digital control signals D5, D6, and D7 to set the resistance of VCRs 38 and 40.

In one embodiment, programmable current source 42 includes four transistors with their drains coupled in parallel the emitters of bipolar transistors 32A and 32B to sink a current from differential pair 32. The transistors are controlled by digital control signals D8, D9, D10, and D11 to set the amount of current to sink from differential pair 32.

Referring back to FIG. 1, register 22 stores the values of digital control signals D1 to D11. Register 22 outputs digital control signals D1 to D11 to VCRs 37, 38, and 40, and programmable current source 42 to set the amplitude characteristics of limiting amplifier 14.

Laser driver 18 has its non-inverted and inverted input terminals coupled to the non-inverted and inverted output terminals of limiting amplifier 14, respectively. Laser drive 18 converts input voltage signals Vout$^+$ and Vout$^-$ to a drive current for laser diode 20. In one embodiment, laser diode 20 is a vertical cavity surface emitting laser (VCSEL).

Simulations and tests have shown that the optimum output eye pattern can be achieved by selecting the proper output amplitude and the proper common-mode of limiting amplifier 14, which is controlled by digital control signals D1 to D11. When the output amplitude of limiting amplifier 14 is bigger than the optimum value, its residue portion contributes to the output eye pattern's overshoot and/or undershoot. When the output amplitude of limiting amplitude 14 is too small, limiting amplifier 14 cannot properly drive laser driver 18. This causes extended rise and fall times of the laser output, which deteriorates the quality of the output eye pattern.

Figure 3A:
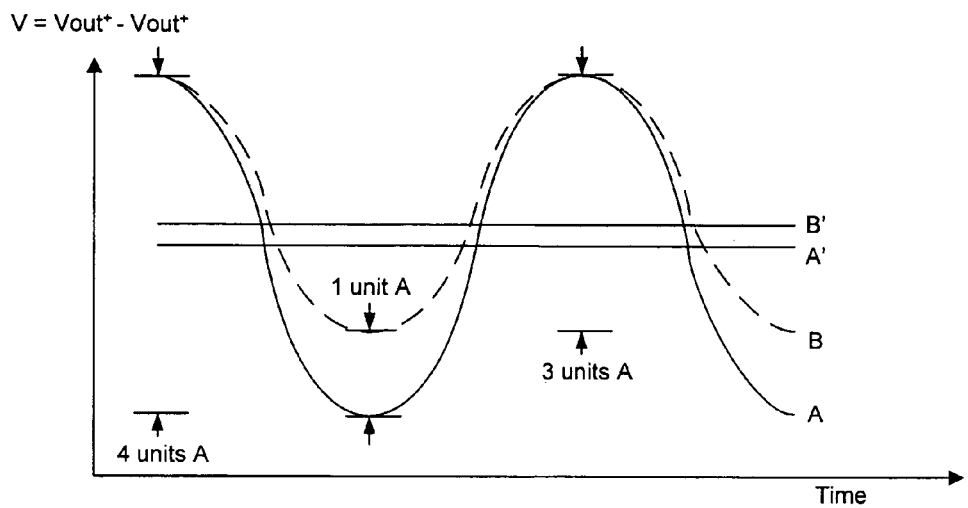
FIGS. 3A, 3B, and 3C are charts of the output voltage from the limiting amplifier of FIG. 1 in one embodiment of the invention.
Figure 3B:
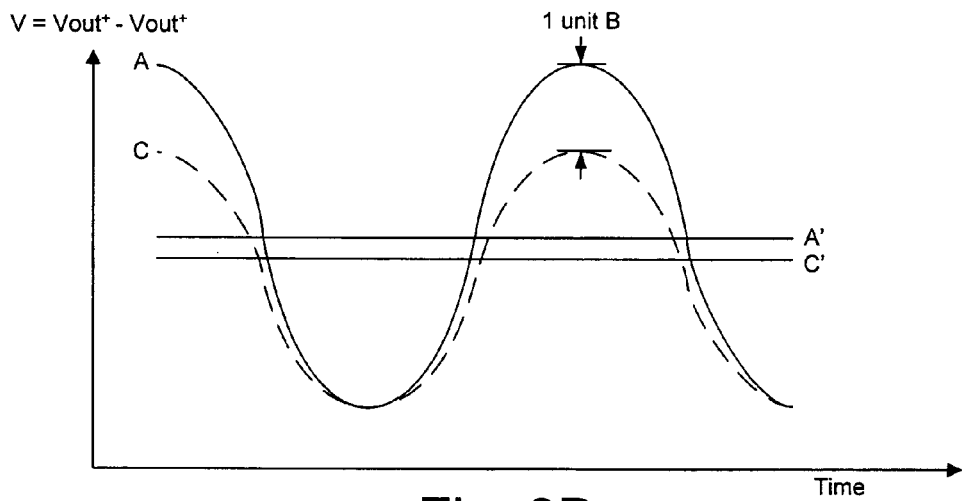
Figure 3C:
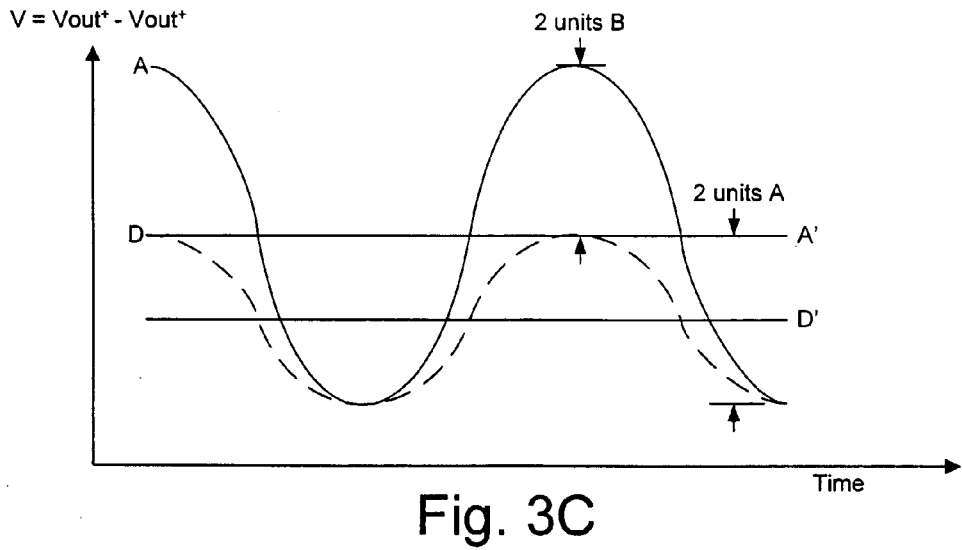

FIGS. 3A, 3B, and 3C are charts of a differential output voltage V from limiting amplifier 14 generated with digital control signals D1 to D7 listed in Table 1 below in one embodiment of the invention. Although not shown, one skilled in the art understands that digital signals D8 to D11 can also be varied to change the amplitude and the common-mode of limiting amplifier 14.

TABLE 1

| Line | D1 | D2 | D3 | D4 | D5 | D6 | D7 |
|------|----|----|----|----|----|----|----|
| A | 1 | 1 | 1 | 1 | 0 | 0 | 0 |
| B | 1 | 1 | 1 | 1 | 0 | 0 | 1 |
| C | 1 | 1 | 1 | 0 | 0 | 0 | 1 |
| D | 1 | 1 | 0 | 0 | 0 | 1 | 1 |

In FIG. 3A, line A illustrates an output voltage V (Vout$^+$−Vout$^-$) and a common-mode A' when the digital control signals D1 to D7 are set at a first set of values. Line B illustrates output voltage V and a common-mode B' when the digital control signals D1 to D7 are changed to a second set of values. By decreasing the resistance of VCRs 38 and 40, the peak-to-peak amplitude of limiting amplifier 14 is decreased from four (4) units A to three (3) units A (where unit A is any arbitrary unit). As a result, common-mode B' is greater than common-mode A'.

In FIG. 3B, line C illustrates the output voltage V and a common-mode C' when the digital control signals D1 to D7 are changed to a third set of values. By increasing the resistance of VCR 37, the peak amplitude of limiting amplifier 14 is decreased by one (1) unit B (where unit B is any arbitrary unit). As a result, common-mode C' is less than common-mode A'.

In FIG. 3C, line D illustrates the output voltage V and a common-mode D' when the digital control signals D1 to D7 are changed to a fourth set of values. By further increasing the resistance of VCR 37, the peak amplitude of limiting amplifier 14 is decreased by two (2) units B. By further decreasing the resistance of VCRs 38 and 39, the peak-to-peak amplitude swing of-limiting amplifier 14 is decreased from three (3) units A to two (2) units A. As a result, common-mode D' is less than common-mode A'. By varying digital control signals D1 to D11, a range of peak-to-peak amplitude, peak amplitude, and common-mode can be achieved.

Figure 4:
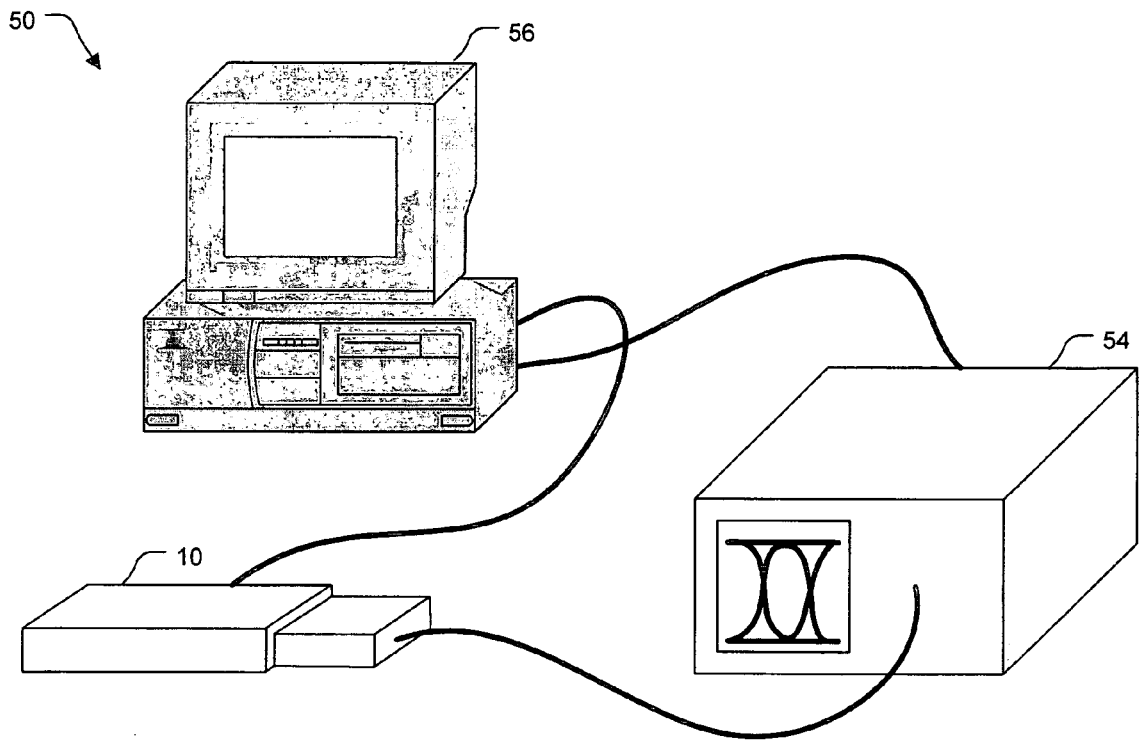
FIG. 4 is a diagram of a system used to calibrate the laser transmitter of FIG. 1 in one embodiment of the invention.

FIG. 4 is a diagram of a system 50 used to calibrate the optimum value of the output amplitude of limiting amplifier 14 in one embodiment of the invention. System 50 includes laser transmitter 10 having an output fiber connected to an oscilloscope 54. Oscilloscope 54 includes a program that outputs the eye mask margin to a computer 56. Computer 56 includes a program that varies the amplitude characteristics of limiting amplifier 14 until the eye mask margin reaches an acceptable value.

Figure 5:
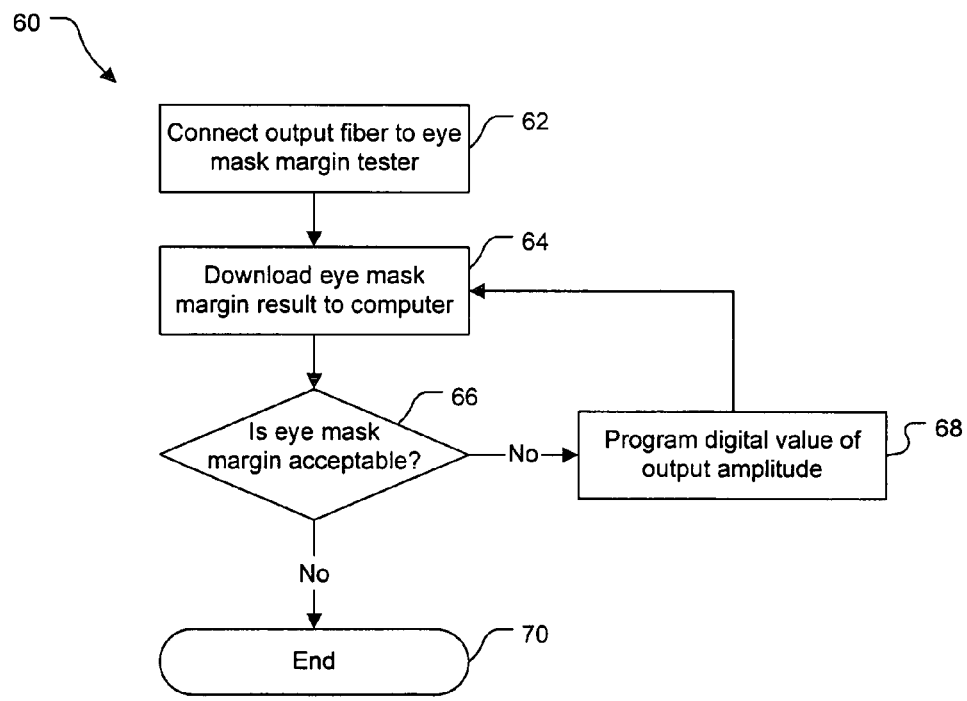
FIG. 5 is a flowchart of a method for calibrating the laser transmitter of FIG. 1 in one embodiment of the invention.

FIG. 5 is a flowchart of a method 60 to use system 50 to calibrate laser transmitter 10 in one embodiment of the invention. In step 62, the output fiber from laser transmitter 10 is connected to oscilloscope 54 with the eye mask margin program. Laser transmitter 10 then starts to transmit random data. Default values of digital control signals D1 to D11 in register 22 are used to control the output amplitude of limiting amplifier 14.

In step 64, oscilloscope 54 downloads the eye mask margin to computer 56.

In step 66, computer 56 determines if the eye mask margin value has reached an acceptable value. If the eye mask margin has not reached an acceptable value, then step 66 is followed by step 68. If the eye mask margin has reached an acceptable value, then step 66 is followed by step 70, which ends method 60.

In step 68, computer 56 writes new values of digital control signals D1 to D11 in register 22. Computer 56 can increment or decrement the values of digital control signal D1 to D11. Step 68 is followed by step 64 and method 60 repeats until computer 56 determines optimum values of digital control signals D1 to D11 that produce an acceptable eye mask margin.

Figure 6:
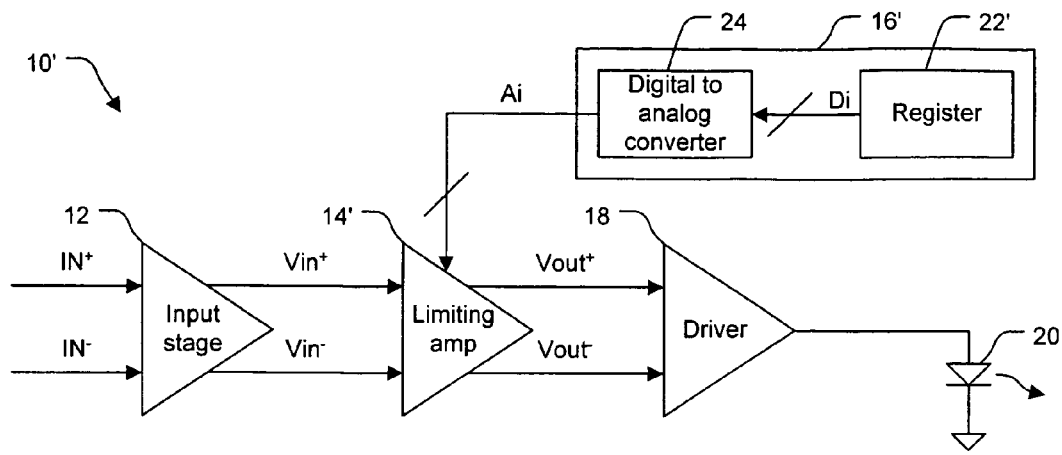
FIG. 6 is a block diagram of a laser transmitter in another embodiment of the invention.

FIG. 6 illustrates a laser transmitter 10' in one embodiment of the invention. Laser transmitter 10' is similar to laser transmitter 10 and their common elements share the same reference number. Laser transmitter 10' includes conventional input stage 12, a limiting amplifier 14', an amplitude/common-mode control circuit 16', conventional laser driver 18, and conventional laser diode 20.

Amplitude/common-mode control circuit 16' includes a register 22' that stores and outputs one or more digital control signals Di to a digital-to-analog converter (DAC) 24. DAC 24 converts digital control signals Di into one or more analog control signals Ai. DAC 24 outputs analog control signals Ai to limiting amplifier 14' to control its amplitude characteristics such as peak-to-peak amplitude, peak amplitude, and common-mode.

Figure 7:
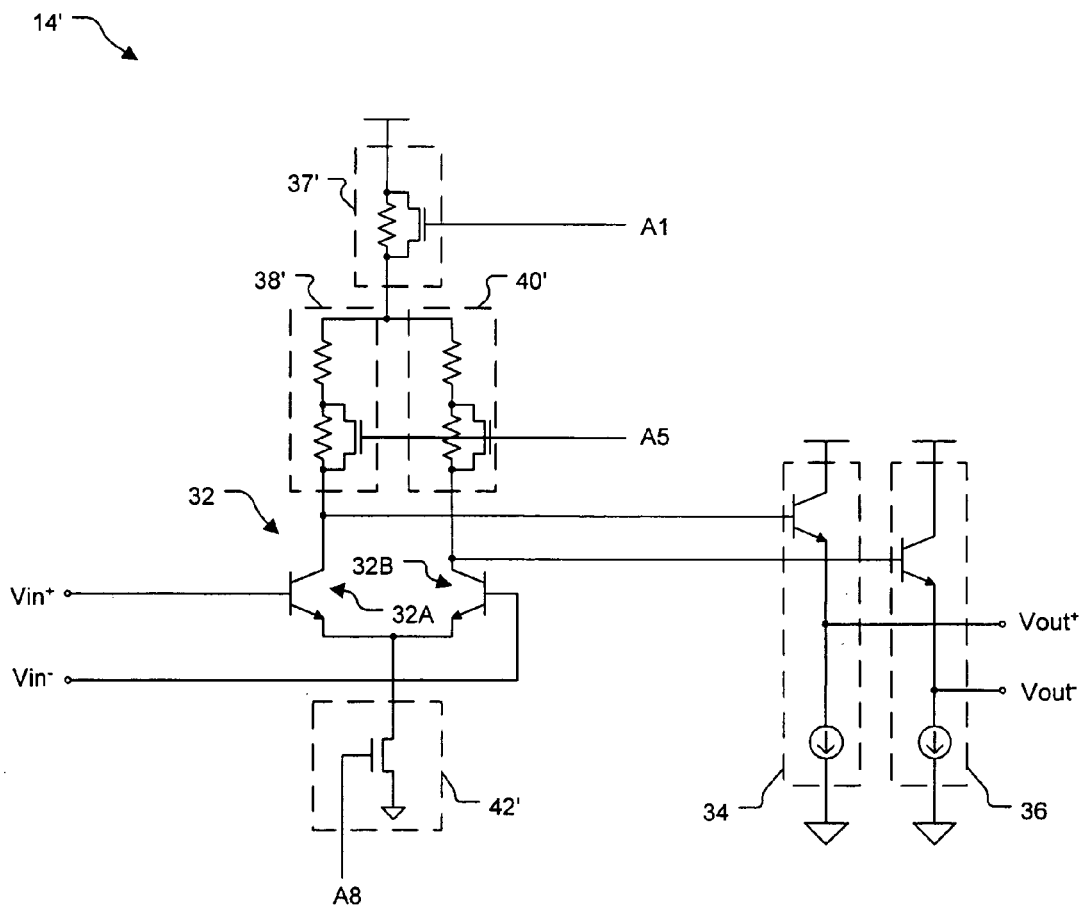
FIG. 7 is a circuit diagram of a limiting amplifier in the laser transmitter of FIG. 6 in one embodiment of the invention.

FIG. 7 is a circuit diagram of limiting amplifier 14' in one embodiment of the invention. Limiting amplifier 14' includes differential pair 32 calibrated by VCRs 37', 38', and 40', and a programmable current source 42'. Limiting amplifier 14' is configured like limiting amplifier 14 of FIG. 2 described above but for the implementation of VCRs 37', 38', and 40', and programmable current source 42'.

In one embodiment, VCR 37' includes one resistor and one bypass transistor coupled in parallel with the resistor so a variable amount of current can bypass the resistor by controlling the gate voltage of the bypass transistor. The gate of the bypass transistor is coupled to analog voltage signal A1 to set the resistance of VCR 37'.

In one embodiment, VCRs 38' and 40' each includes two resistors coupled in series, and one bypass transistor coupled in parallel with its corresponding resistor so a variable amount of current can bypass the resistor by controlling the gate voltage of the bypass transistor. The gates of the bypass transistors are coupled to an analog voltage signal A5 to set the resistance of VCRs 38' and 40'.

In one embodiment, programmable current source 42' includes one transistor with its drain coupled to the emitters of bipolar transistors 32A and 32B to sink a current from differential pair 32. The gate of the transistor is coupled to an analog voltage signal A8 to set the amount of current to sink from differential pair 32.

By changing digital control signals Di in register 22', the amplitudes and the common-mode of limiting amplifier 14' can be modified to achieve the optimum output eye pattern. System 50 of FIG. 4 and method 60 of FIG. 5 can be used to calibrate laser transmitter 10' as described above.

Thus, the present invention does not require external or internal matching circuitry for improving the output eye quality. In addition, the digital control can program the optimum value for each channel in an initial programming stage during production. This individual programming can compensate the part-to-part and channel-to-channel random variations.

Various other adaptations and combinations of features of the embodiments disclosed are within the scope of the invention. Numerous embodiments are encompassed by the following claims.

What is claimed is:

1. A method for calibrating a laser transmitter, comprising:
    (a) detecting an eye diagram of an output from the laser transmitter;
    (b) determining if the eye diagram is acceptable;
    (c) if the eye diagram is not acceptable, changing a value of a control signal of a limiting amplifier coupled to a laser driver in the laser transmitter, wherein the control signal controls at least one variable resistor coupled between rail and a differential pair in the limiting amplifier; and
    (d) repeating steps (a), (b), and (c) until the eye diagram is acceptable.

2. The method of claim 1, wherein the control signal sets a common-mode of a pair of differential output signals from the limiting amplifier.

3. The method of claim 1, wherein the control signal sets a peak amplitude of a pair of differential output signals from the limiting amplifier.

4. The method of claim 1, wherein said detecting an eye diagram comprises:
    coupling the output of the laser transmitter to an oscilloscope, wherein the oscilloscope generates an eye mask margin; and
    downloading the eye mask margin from the oscilloscope to a computer.

5. The method of claim 4, wherein said determining if the eye diagram is acceptable comprises:
    using the computer to determine if the eye mask margin has reached an acceptable value.

6. The method of claim 1, wherein said changing a value of a control signal comprises:
    at least one of incrementing and decrementing the value of tho control signal.

* * * * *

UNITED STATES PATENT AND TRADEMARK OFFICE
CERTIFICATE OF CORRECTION

PATENT NO. : 7,218,654 B2 Page 1 of 1
APPLICATION NO. : 11/205633
DATED : May 15, 2007
INVENTOR(S) : Young Kim It is certified that error appears in the above-identified patent and that said Letters Patent is hereby corrected as shown below:

Col. 6 Line 35 In Claim 6, delete "tho" and insert -- the --, therefor.

Signed and Sealed this

Sixteenth Day of December, 2008

JON W. DUDAS
*Director of the United States Patent and Trademark Office*